(12) United States Patent
Janmey et al.

(10) Patent No.: US 6,300,006 B1
(45) Date of Patent: Oct. 9, 2001

(54) ELECTROCHEMICAL CELL HAVING SEAL AND COVER ASSEMBLY

(75) Inventors: Robert M. Janmey; Nghia Cong Tang, both of Olmsted Township, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/443,572

(22) Filed: Nov. 19, 1999

(51) Int. Cl.$^7$ ...................................................... H01M 2/04
(52) U.S. Cl. .............................. 429/177; 429/53; 429/175
(58) Field of Search ................................ 429/53, 56, 175, 429/174, 177, 71, 72, 82, 185

(56) References Cited

U.S. PATENT DOCUMENTS

| 5,051,323 | 9/1991 | Murphy | 429/165 |
| 5,925,478 | * 7/1999 | Tucholski | 429/56 |
| 6,143,439 | * 11/2000 | Yoppolo et al. | 429/91 |
| 6,207,320 | * 3/2001 | Song et al. | 429/171 |

FOREIGN PATENT DOCUMENTS

| 56156665 | 12/1981 | (JP) . |
| 58209071 | 5/1983 | (JP) . |
| 59033751 | 2/1984 | (JP) . |
| 01151154 | 6/1989 | (JP) . |
| 10247483 | 9/1998 | (JP) . |

* cited by examiner

*Primary Examiner*—Gabrielle Brouillette
*Assistant Examiner*—M. Wills
(74) *Attorney, Agent, or Firm*—Stewart A. Fraser

(57) ABSTRACT

An electrochemical cell having a can for containing electrochemically active materials including positive and negative electrodes and electrolyte. The can has a bottom end and an open top end, and positive and negative electrodes disposed in the can. An inner metal cover is disposed in the open end of the can and has a first peripheral flange. An outer metal cover is disposed over the inner cover in the open end of the container and has a second peripheral flange juxtaposed to the first peripheral flange. A seal is disposed between the can and both the first and second peripheral flanges. The low profile seal assembly advantageously provides for reduced volume consumption thereby allowing for a greater amount of electrochemically active materials in the can.

14 Claims, 2 Drawing Sheets

ELECTROCHEMICAL CELL HAVING SEAL AND COVER ASSEMBLY

BACKGROUND OF THE INVENTION

The present invention generally relates to electrochemical cells, i.e., batteries, and more particularly to a low profile closure assembly for closing and sealing the open end of a battery container.

Conventional alkaline electrochemical cells generally include a steel cylindrical can having a positive electrode, referred to as the cathode, which comprises manganese dioxide as the active material. The electrochemical cell also includes a negative electrode referred to as the anode, which comprises zinc powder as the active material. In a bobbin-type cell construction, the cathode is typically formed against the interior surface of the steel can, while the anode is generally centrally disposed in the can. Alternately, in jelly-roll cells, the anode and cathode are spirally wound. A separator is located between the anode and the cathode, and an alkaline electrolyte solution simultaneously contacts the anode, the cathode, and the separator. A conductive current collector is commonly inserted into the anode active material, and a seal assembly, which includes a seal member, provides closure to the open end of the steel can to seal the active electrochemical materials in the sealed volume of the can.

Cylindrical alkaline cells are commonly closed by inserting a preassembled collector and seal assembly in the open end of the steel can. The collector and seal assembly typically includes the collector nail, an annular nylon seal, and an inner metal cover for radially supporting the nylon seal. The can typically has a taper or an inwardly extending bead at its open end which serves to support the collector and seal assembly in the desired orientation prior to securing it in place. After the collector and seal assembly has been inserted, an outer metal cover is placed over the assembly and the assembly and cover are secured in place by radially squeezing the can against the collector and seal assembly and outer cover and crimping the edge of the can over the peripheral lip of the collector and seal assembly and outer cover to secure the outer cover and collector and seal assembly within the open end of the can. The conventional rollback outer cover has a peripheral edge that is folded back, which results in a non-uniform compression of the seal. Additionally, electrochemical cells commonly employ electrochemically active materials, such as zinc, which generate hydrogen gas during storage and sometimes during or following service use. When the battery can is closed, excessive build-up of high pressure gases within the sealed can may cause damage to the cell and/or the device in which cell is employed.

In order to handle the potentially excessive build-up of pressure in the electrochemical cell, conventional batteries have employed voluminous seals which provide pressure release venting. One pressure relief approach has employed a resealable valve system that periodically releases excessive gas pressure from within the active volume. Another approach employs the use of a vent formed in the annular nylon seal which is intended to rupture upon experiencing excessive pressure build-up in the cell. According to yet another approach, the cell employs a circular thinned region formed in the annular nylon seal. However, the amount of space occupied by the conventional seal, the inner metal cover, and the outer metal cover, can be significant.

The greater the space occupied by the collector and seal assembly, the less space that there is available within the cell for the electrochemically active materials. Consequently, a reduction in the amount of electrochemically active materials that may be provided within the cell results in shorter service life for the cell. It is therefore desirable to maximize the internal volume within an electrochemical cell that is available for the electrochemically active components.

SUMMARY OF THE INVENTION

The present invention minimizes the closure assembly volume for sealing the open end of a cell container. To achieve this and other advantages, and in accordance with the purpose of the invention as embodied and described herein, the present invention provides for an electrochemical cell employing a container having a bottom end and an open top end, and positive and negative electrodes disposed in the container. An inner cover, such as a metal cover, having a first peripheral flange is disposed in the open end of the container. An outer cover is disposed over the inner cover in the open end of the container. The outer cover has a second peripheral flange juxtaposed to the first peripheral flange. A seal is disposed between the container and at least one of the first and second peripheral flanges. The resultant low profile seal assembly advantageously provides for reduced volume consumption thereby allowing for a greater amount of electrochemically active materials in the container.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
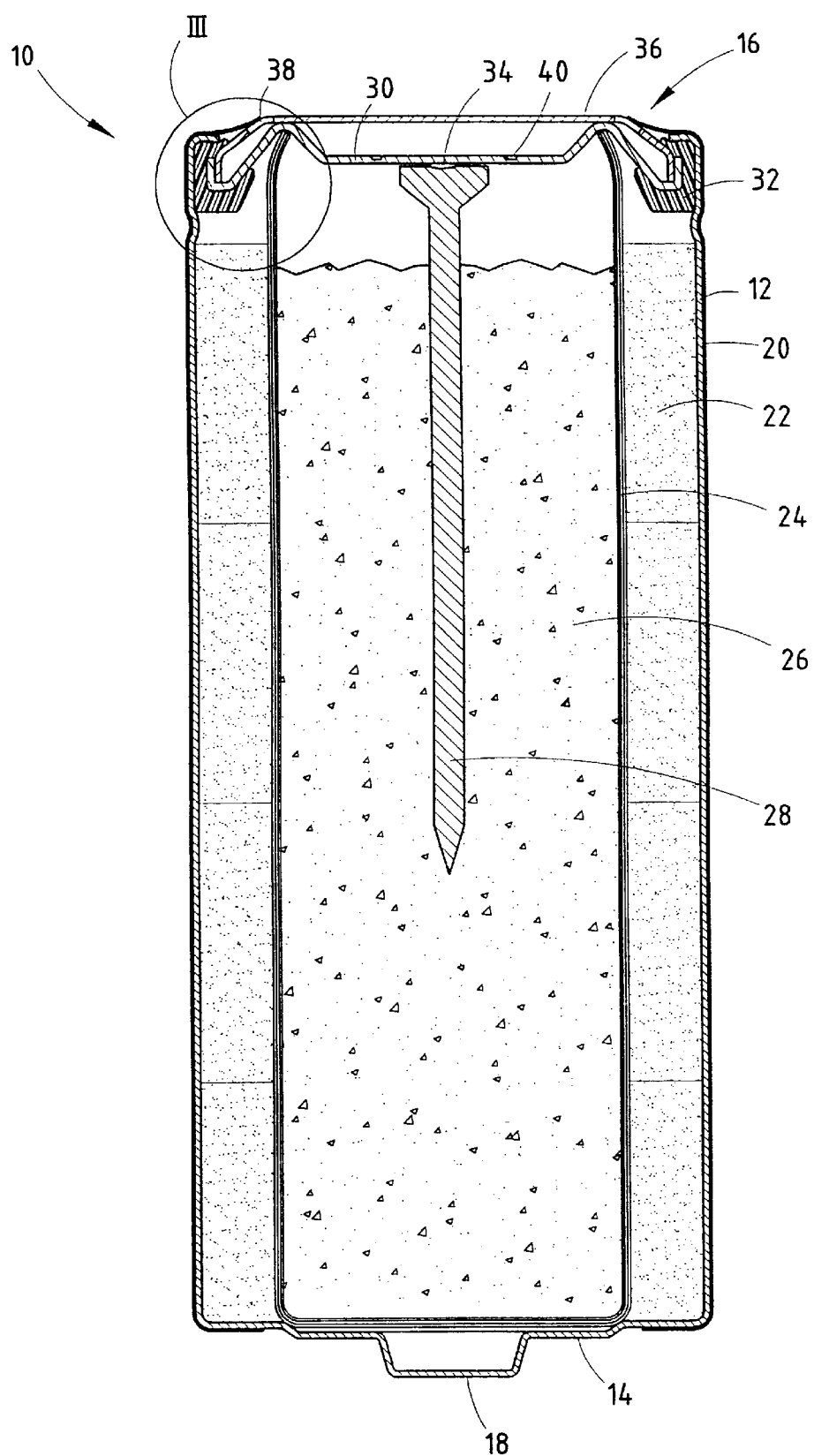
FIG. 1 is a longitudinal cross-sectional view of an electrochemical cell having a low profile seal assembly for closing the open end of the can according to the present invention.

Referring to FIG. 1, a cylindrical alkaline electrochemical cell 10 is shown therein having a low profile seal assembly for closing the open end of the cell container according to the present invention. The electrochemical cell 10 includes a cylindrical steel can 12 having a closed bottom end 14, an open top end 16 and side walls extending between the top and bottom ends. The closed bottom end of can 12 includes a protruding nub 18 formed at its center region for providing the positive contact terminal of cell 10. While the positive contact terminal 14 is shown integrally formed in the bottom end 14 of the can 12, it should be appreciated that a separate positive contact terminal could be welded or otherwise attached to a flat bottom end of the can 12.

Assembled to the open top end 16 of steel can 12 is an inner metal cover 30 and an outer metal cover 36, which substantially closes the open end 16 of steel can 12. Outer metal cover 36 serves as the negative contact terminal and preferably covers the top surface of inner metal cover 30. According to the embodiment shown, outer metal cover 36 and inner metal cover 30 are electrically coupled to each other. However, it should be appreciated that inner metal cover 30 could be electrically insulated from outer metal cover 36, such as to provide a neutral cover, for example.

A metalized, plastic film label 20 is formed about the exterior surface of steel can 12, except for the ends of steel can 12. Film label 20 is formed over the peripheral edge of the bottom end 14 of steel can 12 and may extend partially onto the negative cover 36 as shown.

A cathode 22 is formed about the interior surface of steel can 12. Cathode 22 may be formed of a mixture of manganese dioxide, graphite, potassium hydroxide solution, and additives, according to one example. The separator 24, which may be formed of a non-woven fabric that prevents migration of any solid particles in the cell, is disposed about the interior surface of cathode 22. An anode 26 is disposed with an electrolyte into the separator 24 and in contact with a current collector 28 which may include a brass nail having an elongated body and an enlarged head at one end. The anode 26 may be formed of zinc powder, a gelling agent, and additives, according to one example. Accordingly, the cathode 22 is configured as the positive electrode, and the anode 26 is configured as the negative electrode. While a bobbin-type cell construction is shown, it should be appreciated that the electrochemical cell 10 may be otherwise constructed, such as a jelly-roll construction.

The inner metal cover 30 is preferably formed of plated steel, and preferably has a nickel coating, an asphalt coating, and/or other corrosion resistant material on the bottom surface thereof. The current collector 28 contacts the inner metal cover 30 and cover 30 is shown welded on its bottom surface to the current collector 28 via weld 34. A ring-shaped nylon seal 32 having a J-shaped cross section, or alternately an L-shaped cross-section, is disposed in the open end 16 of steel can 12 to provide a seal between the steel can 12 and the inner and outer metal covers 30 and 36 to prevent leakage of electrochemically active cell materials contained in the steel can 12. The assembly of the seal 32 may include disposing the seal 32 in the open end 16 of steel can 12 on top of a bead 15 that is formed radially inward on the inner walls of steel can 12, disposing the inner metal cover 30 and outer metal cover 36 on top of seal 32, and crimping the upper end of can 12 radially inward and over the outer periphery of the seal 32 to compress it against bead 15. Therefore, the nylon seal 32 is compressed between the peripheral flanges of inner and outer metal covers 30 and 36 and the upper end walls of steel can 12. It should be appreciated that the inner metal cover 30 and outer metal cover 36 are electrically insulated from the steel can 12 by way of seal 32. Additionally, the inner metal cover 30, current collector 28, and J-shaped seal 32 may be preassembled as a unit to form a collector and seal assembly prior to disposal in the can 12. Further, the outer metal cover 36 may also be preassembled onto the collector and seal assembly for easy disposal in the open end 16 of can 12.

According to the present invention, the inner metal cover 30 has a peripheral flange 42 that extends substantially parallel to the side walls of the steel can 12, which in turn are substantially parallel to the longitudinal axis of the cell 10. In addition, the outer metal cover 36 likewise has a peripheral flange 44 that extends substantially parallel to the side walls of the steel can 12. The peripheral flanges 42 and 44 extend in opposite directions with flange 42 extending upward, and flange 44 extending downward, and are arranged juxtaposed to each other so that they are parallel and contact each other.

The inner metal cover 30 is further shown having a pressure release mechanism 40 formed therein for venting to release high pressure gases from within the sealed volume of the can 12 upon reaching a predetermined pressure. The pressure release mechanism 40 has a reduced thickness section that is intended to fracture and bow upward to release high pressure gases. The outer metal cover 36 is spaced above the pressure release mechanism 40 to provide a space therebetween to allow for the pressure release mechanism 40 to bow outward a sufficient distance to provide adequate venting.

Figure 2:
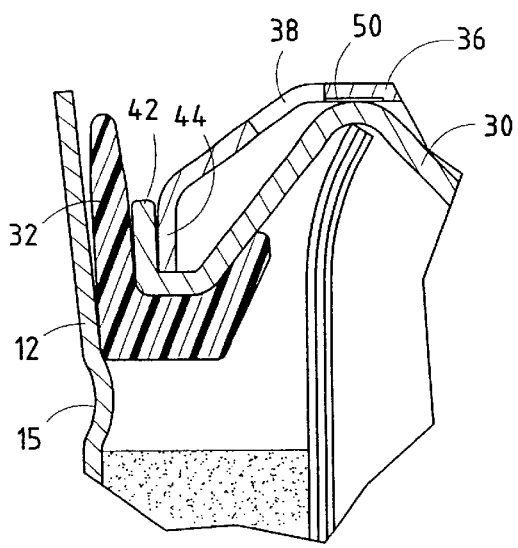
FIG. 2 is an enlarged sectional view of section III prior to can crimping.
Figure 3:
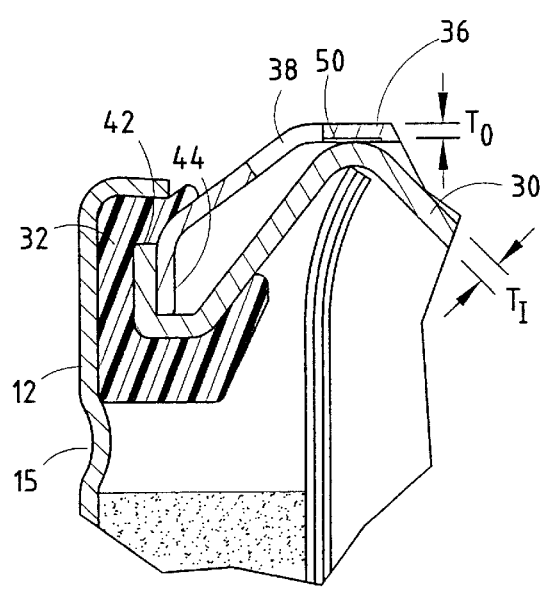
FIG. 3 is an enlarged sectional view of section III of FIG. 1 after can crimping.

The seal assembly is further shown prior to the can crimping in FIG. 2, and again following can crimping in FIG. 3. The ring-shaped seal 32 is disposed into the open end 16 of steel can 12 so that it rests on top of bead 15. The inner metal cover 30 has an inverted V-section which receives the upper end of separator 24. The vertically disposed peripheral flange 42 is provided as an extension of inner metal cover 30 located radially outward from the inverted V-section and conforms to the inside surface of seal 32. The outer metal cover 36 has the peripheral flange 44 juxtaposed to the radially inward surface of the peripheral flange 42. During the can crimping process, the open end 16 of steel can 12 is pressed radially inwardly so as to compress seal 32 and to crimp the upper end of can 12 over the upper edge of seal 32. Accordingly, seal 32 is compressed between the bead 15 and outer crimped edge of steel can 12.

The outer negative cover 36 also contacts the inner metal cover 30 above the inverted V-shaped section. Provided between inner metal cover 30 and outer negative cover 36 are gaps 50 which provide passages for vented gas to be released during a venting condition to the outside atmosphere via one or more openings 38 formed in outer metal cover 36. Gaps 50 may include channels formed in the bottom surface of outer metal cover 36 or protruding ribs extending from the upper surface of inner metal cover 30 at a region above the inverted V-shaped section.

Additionally, inner metal cover 30 has a thickness $T_I$ and the outer metal cover 36 has a thickness $T_O$. It is preferred that the total combined thickness $T_I+T_O$ of the peripheral flanges 42 and 44 be in the range of 20 to 30 mils to provide sufficient constant hoop strength to seal the steel can 12 closed and maintain the structural integrity of the cell 10. The thickness $T_I$ may be substantially equal to the thickness $T_O$. However, it should be appreciated that the thicknesses $T_I$ and $T_O$ relative to each other may be varied. For example, the thickness $T_I$ of the inner metal cover 30 may be a reduced thickness as compared to the thickness $T_O$ to allow for ease of forming the pressure release mechanism 40. For example, inner metal cover 30 may have a thickness $T_I$ of approximately 5 mils, as compared to the outer metal cover 36 having a thickness $T_O$ of approximately 15 mils.

Figure 4:
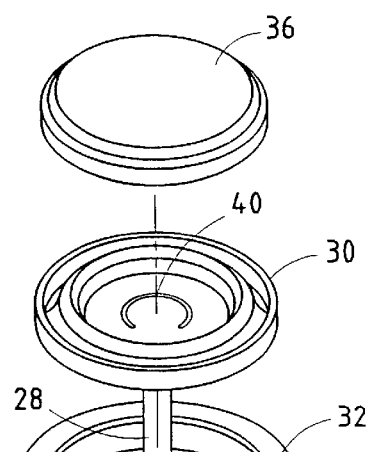
FIG. 4 is an exploded elevational view of the low profile seal assembly for closing the open end of the cell can.
Figure 4:
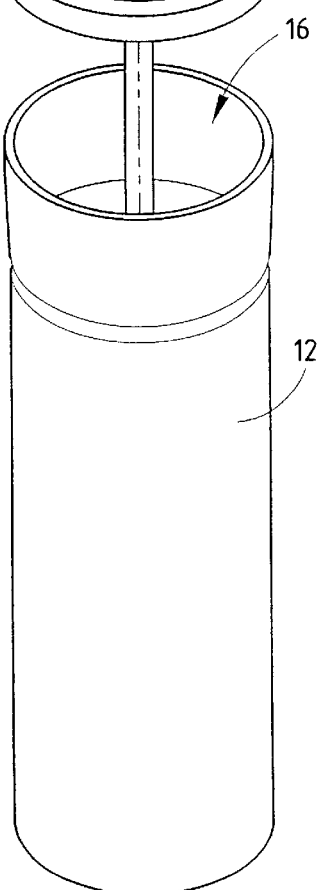

Referring to FIG. 4, the assembly of the electrochemical cell 10 is illustrated therein. The seal 32 receives the inner metal cover 30 with the collector nail 28 welded thereto. Once the electrochemically active materials including the cathode 22 and the anode 26, as well as the separator 24 and electrolyte have been dispensed within the steel can 12, the open end 16 of can 12 is ready for closure. The collector and seal assembly is then disposed in the open end 16 of steel can 12 so that it rests on top of a beaded or tapered wall. The outer metal cover 36 may be placed on top of the inner metal cover 30 prior to the seal insertion to form a preassembled collector and seal assembly. The steel can 12 is then crimped closed over the seal 32 to seal the can 12 closed. Thereafter, the label 20 may be applied to the outer wall of steel can 12.

Accordingly, the inner metal cover 30, outer metal cover 36 and seal 32 form a low volume closure to the open end 16 of steel can 12. Peripheral flanges 42 and 44 matingly engage one another in a manner that allows the steel can 12 to be crimped closed so that the peripheral flanges 42 and 44 are uniformly compressed radially inwardly. Accordingly, as the steel can 12 is crimped closed, peripheral flanges 42 and 44 move radially inwardly together in concert and remain substantially parallel to one another, without creating void space therebetween. The inner metal cover 30 and outer metal cover 36 thereby serve to act in concert like a spring to absorb thermal expansion and contractions of the cell 10. Preferably, the inner metal cover 30 and outer metal cover 36 are crimped to be under stress no greater than approximately the yield stress of the cover material.

Additionally, the stress concentration pressure release mechanism 40 formed in the inner metal cover 30 is intended to fracture to release high pressure gases upon reaching a predetermined pressure differential. Stress concentration pressure release mechanism 40 includes a reduced thickness arcuate groove formed about an approximate 270 degree rotation in the top surface and/or bottom surface of inner metal cover 30. The pressure release mechanism 40 is intended to fracture along its groove and remain connected at the hinge. The stress concentration groove 40 may be formed by coining techniques or other thickness reduction techniques. It should be appreciated that by employing both inner and outer metal covers 30 and 36 in accordance with the present invention, a reduced thickness inner metal cover 30 having a thickness $T_I$ such as 5 mils, for example, may be employed with an outer metal cover thickness $T_O$ of approximately 15 mils, to provide an overall thickness at the peripheral flanges 42 and 44 equal to 20 mils. This allows a reduction in the thickness $T_I$ of the inner metal cover 30 which enhances formation of the stress concentrator 40.

The stress concentration pressure relief mechanism 40 of the present invention is positioned beneath the negative outer cover 36 so as to prevent the electrochemical materials from spraying directly outward from battery 10 upon rupture. To allow for release of venting gas to the outside atmosphere, the negative cover 36 has one or more openings 38 formed therein. Also, the provision of the negative cover 36 over pressure release mechanism 40 allows mechanism 40 to bow outwardly under the negative cover 36 and ultimately rupture. Accordingly, negative outer cover 36 prevents inadvertent damage to the pressure release mechanism 40 and shields mechanism 40 from the corrosive effects of the ambient environment and therefore reduces the possibility of premature venting and/or leakage.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. An electrochemical cell comprising:
   a container having a bottom end, and an open top end, and side walls extending between the top and bottom ends;
   a positive electrode disposed in said container;
   a negative electrode disposed in said container;
   an inner cover disposed in the open end of said container and having a first peripheral flange;
   an outer cover disposed over said inner cover in the open end of said container and having a second peripheral flange juxtaposed to said first peripheral flange, wherein said first and second flanges extend substantially parallel to the side walls of the container and each flange has an outer edge, the outer edge of the first flange is oriented towards one of the top and bottom ends of the container while the outer edge of the second flange is oriented towards the other of the top and bottom ends of the container; and
   a seal disposed between said container and at least one of said first and second peripheral flanges.

2. The electrochemical cell as defined in claim 1, wherein said inner cover further comprises a pressure relief mechanism for releasing internal pressure from within the container when the internal pressure becomes excessive.

3. The electrochemical cell as defined in claim 2 further comprising a passage provided between said inner cover and said outer cover and an opening formed in the outer cover for releasing high pressure gases during cell venting.

4. The electrochemical cell as defined in claim 2, wherein said pressure relief mechanism comprises a stress concentration groove.

5. The electrochemical cell as defined in claim 1, wherein said cell further comprises a current collector connected to said inner cover.

6. The electrochemical cell as defined in claim 1, wherein said seal comprises a ring having an open center region.

7. The electrochemical cell as defined in claim 6, wherein said seal has a J-shaped cross section.

8. The electrochemical cell as defined in claim 1, wherein the first and second peripheral flanges each have an outer edge, and the outer edges are oriented in opposite directions relative to each other.

9. The electrochemical cell as defined in claim 1, wherein said inner and outer covers each comprise metal.

10. An electrochemical cell comprising:
    a container having a bottom end an open top end, and side walls extending between the top and bottom ends;
    a positive electrode disposed in said container;
    a negative electrode disposed in said container;
    an inner metal cover disposed in the open end of said container and having a first peripheral flange arranged substantially parallel to the side walls of said container;
    an outer metal cover disposed over said inner metal cover in to open end of said container and having a second peripheral flange arranged substantially parallel to the side walls of said container and juxtaposed to said first peripheral flange, said first and second flanges each have an outer edge and the outer edges are oriented in opposite directions;
    a seal disposed between the container and at least one of said first and second peripheral flanges; and
    a pressure relief mechanism formed in said inner cover for releasing internal pressure from within the container when the internal pressure becomes excessive.

11. The electrochemical cell as defined in claim 10, wherein said pressure relief mechanism comprises a stress concentration groove.

12. The electrochemical cell as defined in claim 11 further comprising a passage between the inner cover and the outer cover and an opening formed in the outer cover for venting high pressure gas during cell venting.

13. The electrochemical cell as defined in claim 10, wherein said seal comprises a ring having an open center region.

14. The electrochemical cell as defined in claim 13, wherein said seal has a J-shaped cross section.

* * * * *